March 31, 1959
C. E. SCHLOSSER ET AL
2,880,369
HIGH PRESSURE VAPOR ARC LAMP
Filed July 10, 1957
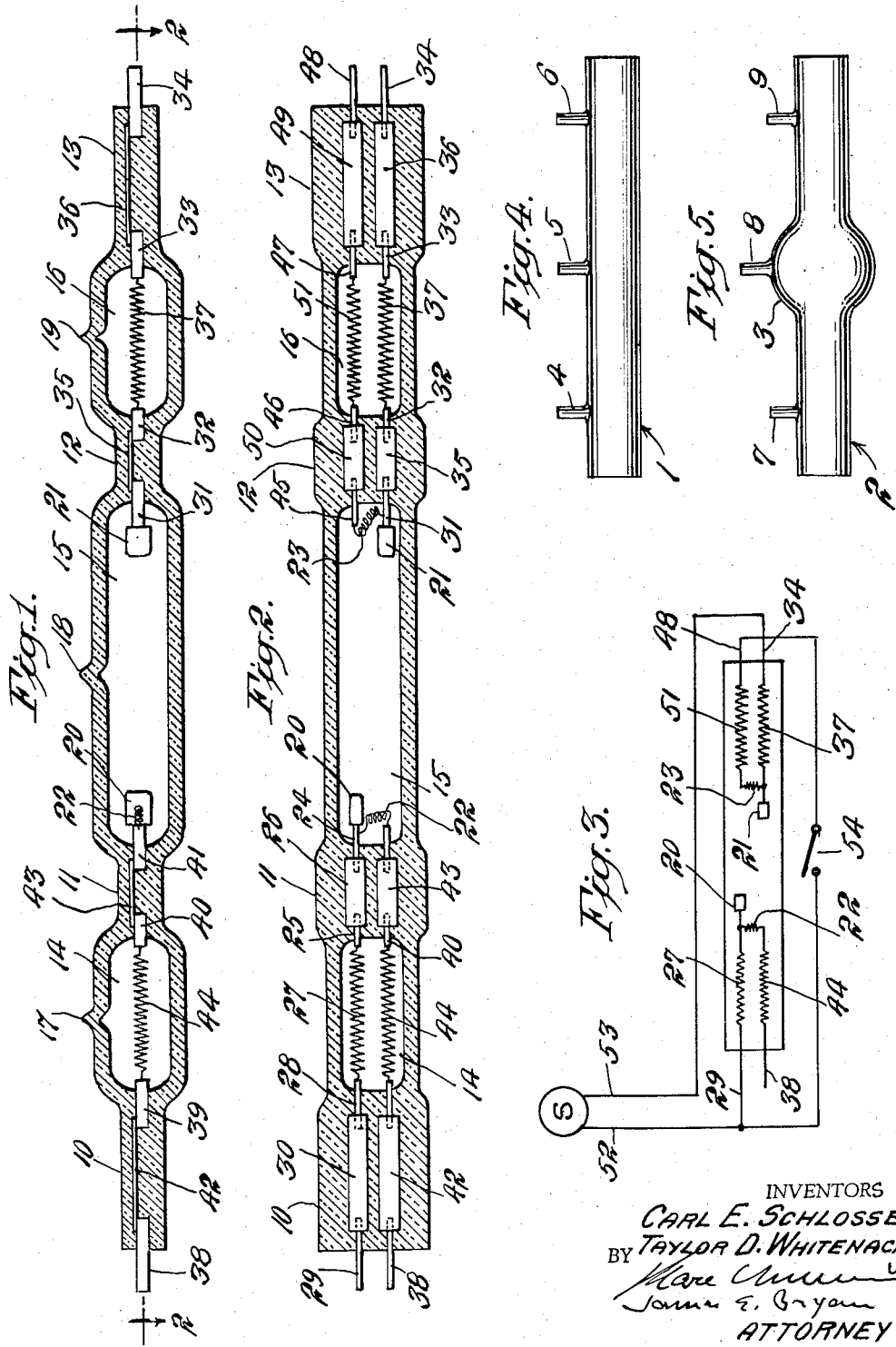
INVENTORS
CARL E. SCHLOSSER
BY TAYLOR D. WHITENACK, JR.
ATTORNEY 2,880,369
Patented Mar. 31, 1959

2,880,369

HIGH PRESSURE VAPOR ARC LAMP

Carl E. Schlosser and Taylor D. Whitenack, Jr., Livingston, N.J., assignors to Engelhard Industries, Inc., a corporation of New Jersey Application July 10, 1957, Serial No. 671,023

1 Claim. (Cl. 315—49)

The present invention deals with a high pressure vapor arc lamp and more particularly with a self ballasted high pressure vapor arc lamp.

Ballasts are generally used in conjunction with vapor arc lamps for the purpose of maintaining and controlling the electrical characteristics of the lamp. Heretofore, such ballasts have been mounted outside the lamp envelope necessitating special separate mountings, or the ballasts have been mounted inside the arc chamber necessitating protecting means for shielding the ballast from the arc. In both cases the ballasts are subject to deterioration either by oxidation or excessive temperatures, whereby the desirable impedance of the ballast is deleteriously affected.

It is an object of the present invention to provide an economical as well as a highly efficient self-ballasted vapor arc lamp. It is another object of the present invention to provide a ballast means as a part of a lamp assembly and which is adapted to maintain desirable impedance over long periods of use. Other objects and advantages of the invention will become apparent from the description hereinafter following and the drawings forming a part hereof, in which:

Figure 1 illustrates a partly elevational and partly longitudinal sectional view of a lamp according to the invention, Figure 2 illustrates a partly elevational and partly longitudinal sectional view along lines 2—2 of Figure 1, Figure 3 illustrates a schematic circuit for starting and operating the lamp, Figure 4 illustrates the lamp envelope prior to assembly of the lamp, and Figure 5 illustrates a modified form of lamp envelope prior to assembly of the lamp.

The present invention deals with a vapor arc lamp, e.g. a high pressure mercury vapor arc lamp, having integrally incorporated therewith a ballast means which is adapted to maintain a desirable ballast impedance under substantially long periods of operation by means of a particular lamp structure which reduces the susceptibility of the ballast to deterioration and which, therefore, provides for a substantially long useful lamp life with a minimum change of ballast operating impedance. The expression "ballast operating impedance" refers to impedance after the lamp has been ignited and not to the initial impedance during starting of the lamp, since the impedance of the ballast may increase from ignition to final operating impedance.

In the manufacture of the self-ballasted lamp according to the invention, either a cylindrical light transmissive vitreous tube 1, as shown by Figure 4, or a light transmissive tube 2 having a bulbous mid-section 3 are each provided with a plurality of filling tubes 4, 5, 6 and 7, 8, 9 spaced longitudinally of the main tubes and communicating with the interior of the main tubes. The tubes are preferably formed of fused quartz. Having provided, for example, the tube of Figure 4, conducting components serially connected to an electrode are positioned within the tube and anchored therein by heat press sealing and embedding certain conductor components within the fused quartz of the tube and thereby forming seals 10, 11, 12 and 13 and providing isolated chambers 14, 15 and 16 spaced longitudinally of the tube with the central chamber 15 being an arc chamber.

After provision of the aforesaid chambers and seals, the chambers are preferably first purged with an inert gas and then filled with gaseous atmosphere, hereinafter more particularly set forth following which the filling tubes 4, 5 and 6 are sealed off as illustrated by the filling tips 17, 18 and 19 and thereby providing a unitary lamp structure according to the invention.

Referring particularly to Figures 1 and 2, the lamp assembly comprises an arc chamber 15 containing a pair of spaced electrodes 20 and 21, at least one resistance 22 and 23, and an ionizable atmosphere of rare gas or a rare gas and mercury in an amount sufficient when vaporized to provide an operating pressure above about .5 atmosphere, e.g. three atmospheres and higher. Electrode 20 is connected in series to a pair of longitudinally spaced conductors 24 and 25 bridged by a thin strip or foil 26, e.g. a molybdenum strip, to a ballast resistance 27, e.g. a resistance coil, and to another pair of longitudinally spaced conductors 28 and 29 bridged by a strip or foil 30. Electrode 21 is connected in series to an arrangement of conductors 31, 32, 33, 34 and strips or foils 35 and 36 and ballast resistance 37 identical to the conductors and strips described with respect to those connected to electrode 20. In addition to the series arrangement of conductors, strips and ballast connected to the electrodes, a similar arrangement of conductors 38, 39, 40, 41, strips 42 and 43 and ballast 44 is connected to the resistance 22, which resistance bridges conductors 24 and 41. Another similar series arrangement of conductors 45, 46, 47, 48, strips 49 and 50, and ballast 51 is connected to the resistance 23, which bridges conductors 31 and 45. The conductor, strip and ballast components connected to resistance 22 are preferably positioned in parallel spaced relationship to the similar components connected to electrode 20, and the conductor, strip and ballast components connected to resistance 23 are preferably positioned in parallel spaced relationship to the similar components connected to electrode 21.

With the serially components so arranged, the heat pressing at the tube 1 at the locations 10, 11, 12 and 13 forms hermetical seals at such locations and divides the tube into a plurality of longitudinally spaced chambers 14, 15 and 16. Prior to sealing off the stems 4, 5 and 6, the arc chamber is filled with an ionizable atmosphere as hereinabove described, and the chambers hermetically enclosing the ballasts 27, 37, 44 and 51 are filled with an inert gas, e.g. nitrogen, argon, xenon, neon, etc., at pressures up to one atmosphere, which atmosphere protects the ballasts from rapid deterioration, which maintains the operating impedance of the ballasts substantially constant over long operating periods.

While the drawings illustrate a resistance 22 and 23 each of which is electrically connected in series to an electrode 20 and 21, only one such resistance 22 may be employed and the other 23 may be omitted together with its series input components. However, when both resistances are incorporated, only one may be effectively employed as a starting resistance to ionize the gas of the arc chamber 15 prior to the establishment of the arc between the electrodes.

Figure 3 illustrates an ignition and operating circuit employed in combination with the above-described lamp assembly. The circuit conductors 52 and 53 are electrically connected in series to a source of current S and to electrodes 20 and 21 through ballasts 27 and 37, providing the lamp operating circuit. An auxiliary ignition circuit is electrically connected across the leads 52 and 53 through resistance 23 and ballast 51 with a series switch 54 in said ignition circuit.

When the starting switch 54 is open, the voltage impressed across the main electrodes 20 and 21 is ordinarily insufficient to ionize the gas in the arc chamber to establish an arc between the electrodes. However, when the switch 54 is closed, the current flows to electrode 20 and to the resistance 23 through ballast 51. The resistance becomes heated and ionizes the gas, whereby an arc is established between electrode 20 and resistance 23, said arc immediately transferring itself between the main electrodes, and the switch is again opened with the arc being maintained between the said main electrodes. Should the starting resistance 23 become defective and inoperable, the ignition circuit is disconnected from the ballast 51 and connected to the ballast 44, thereby providing effective ignition through resistance 22. It is apparent that the ignition circuit is reversible when one of the starting resistances 22 and 23 becomes inoperative.

While the invention has been described in connection with the specific illustration, various modifications are contemplated within the scope of the appended claim.

What is claimed is:

A high pressure vapor arc lamp comprising in combination a vitreous light transmissive arc vessel containing spaced electrodes and an ionizable atmosphere, at least a pair of vitreous members extending outwardly of said arc vessel, electrical input means passing through said vitreous members and connected to said electrodes, the input means connected to at least one of said electrodes comprising a ballast member, a chamber in at least one of said vitreous members, said chamber containing at least said ballast member and an inert gas, and means hermetically sealing said input means and said ballast member in said vitreous members, the arc vessel containing at least one resistance member electrically connected to an electrode, input means for said resistance member hermetically sealed through said vitreous member and contained in said chamber.

References Cited in the file of this patent

UNITED STATES PATENTS

| | | |
|---|---|---|
| 2,208,998 | Mey | July 23, 1940 |
| 2,295,043 | Lompe | Sept. 8, 1942 |
| 2,344,122 | Bay | Mar. 14, 1944 |
| 2,353,668 | Hinman | July 18, 1944 |

FOREIGN PATENTS

| | | |
|---|---|---|
| 922,966 | France | Feb. 10, 1947 |